United States Patent
Yu et al.

(10) Patent No.: US 11,668,378 B1
(45) Date of Patent: Jun. 6, 2023

(54) LINEAR TRANSMISSION DEVICE

(71) Applicant: HIWIN TECHNOLOGIES CORP., Taichung (TW)

(72) Inventors: Szu-Wei Yu, Taichung (TW); Chih-Hsiang Chen, Taichung (TW); Meng-Ying Lin, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 17/527,848

(22) Filed: Nov. 16, 2021

(51) Int. Cl.
*F16H 25/22* (2006.01)
*F16H 25/24* (2006.01)
*F16H 57/01* (2012.01)

(52) U.S. Cl.
CPC ......... *F16H 25/2214* (2013.01); *F16H 25/24* (2013.01); *F16H 57/01* (2013.01)

(58) Field of Classification Search
CPC ...... F16H 25/2214; F16H 25/24; F16H 57/01; F16H 2048/207; F16H 25/2418; F16H 2007/0861
See application file for complete search history.

(56) References Cited

U.S. PATENT DOCUMENTS

| | | | |
|---|---|---|---|
| 10,914,368 B2 * | 2/2021 | Chen | F16H 25/2204 |
| 11,268,607 B1 * | 3/2022 | Nook | B29C 45/14819 |
| 2007/0227280 A1 * | 10/2007 | Chen | F16H 25/2209 |
| | | | 74/89.42 |
| 2007/0251329 A1 | 11/2007 | Balasu et al. | |
| 2012/0014631 A1 * | 1/2012 | Huang | F16H 57/01 |
| | | | 384/446 |
| 2014/0165759 A1 * | 6/2014 | Jeng | F16H 25/2006 |
| | | | 74/424.81 |
| 2014/0260729 A1 * | 9/2014 | Jiang | F16H 57/0464 |
| | | | 74/89.23 |
| 2015/0096396 A1 * | 4/2015 | Jeng | F16H 25/2209 |
| | | | 74/424.81 |
| 2015/0147007 A1 * | 5/2015 | Hu | F16H 25/2214 |
| | | | 384/8 |

(Continued)

FOREIGN PATENT DOCUMENTS

DE 102018102098 A1 8/2019
DE 102020100869 A1 7/2021

(Continued)

*Primary Examiner* — Zakaria Elahmadi
(74) *Attorney, Agent, or Firm* — Muncy, Geissler, Olds & Lowe, P.C.

(57) ABSTRACT

A linear transmission device includes a screw, a moving member, a return element, and a sensor. The moving member is set in the screw to form a load path therebetween. The return element is set in the moving member and has a return path connected to the load path. The return path and the load path constitute a circulating path for balls to run. The moving member has an internal thread with an ineffective thread section. The moving member has a receiving groove adjacent to the ineffective thread section. The sensor is embedded in the receiving groove of the moving member without affecting the operation of the balls. Thus, the linear transmission device of the present invention can solve the problem of the sensor protruding from the moving member, so that the configuration of the surrounding space and the stroke of the moving member will not be affected.

9 Claims, 14 Drawing Sheets

(56) References Cited

U.S. PATENT DOCUMENTS

| | | | | |
|---|---|---|---|---|
| 2015/0226311 A1* | 8/2015 | Lee | ............ | F16H 57/01 |
| | | | | 74/424.86 |
| 2017/0159778 A1* | 6/2017 | Jeng | ............ | F16H 25/2006 |
| 2020/0025281 A1* | 1/2020 | Chen | ............ | F16H 57/01 |
| 2021/0215238 A1* | 7/2021 | Lin | ............ | F16C 31/06 |

FOREIGN PATENT DOCUMENTS

| | | | | |
|---|---|---|---|---|
| DE | 102020102205 A1 | 8/2021 | | |
| JP | 1983-051052 A | 3/1983 | | |
| JP | S5851052 A | 3/1983 | | |
| JP | 2003011038 A | 1/2003 | | |
| JP | 2011241843 A | 12/2011 | | |
| JP | 2016008962 A | 1/2016 | | |
| KR | 102182351 B1 * | 11/2020 | ............ | F16H 25/24 |
| TW | I585342 B | 6/2017 | | |
| TW | I683984 B | 2/2020 | | |
| TW | I701101 B | 8/2020 | | |
| WO | 2015064444 A1 | 5/2015 | | |

* cited by examiner

LINEAR TRANSMISSION DEVICE

BACKGROUND OF THE INVENTION

1. Field of the Invention

The present invention relates to linear transmission devices and more particularly, to a linear transmission device that does not affect the surrounding space configuration.

2. Description of the Related Art

Common linear transmission devices (such as ball screws or linear slides) usually have sensors on moving members (such as nuts or sliders). The sensor is used to sense the temperature, vibration or torque of the moving member during operation, so that the machine operator can monitor it in real time to ensure the accuracy of processing or transmission.

Taiwan Patent No. 1585342 discloses that the sensing port of the sensor is attached to the nut or slider. Taiwan Patent No. 1683984 discloses that the sensing chip is placed in the outer extension of the sensor housing, and the outer extension of the sensing housing extends into the recessed groove from the axial or radial surface of the nut. Taiwan Patent No. 1701101 discloses that the flange of the nut is axially or radially provided with a positioning groove for insertion of the embedded device, and the sensor module is set in the positioning groove and has a signal connection with the embedded device. However, in the above three patent documents, the sensor protrudes out of the nut after the sensor is installed, which not only easily affects the configuration of existing mechanisms around it, but also in the case where the sensor protrudes from the axial end surface of the nut, the stroke of the nut is affected.

On the other hand, Japanese Patent publication No. 58-51052 discloses that a temperature sensor is inserted into the nut obliquely from one end surface of the nut to sense the temperature change of the nut during operation. However, the aforementioned temperature sensor extends into the effective thread section (that is, the area through which the balls pass), which causes the structural rigidity of the nut to be damaged, and may even affect the movement of the balls.

SUMMARY OF THE INVENTION

The present invention has been accomplished under the circumstances in view. It is the main object of the present invention to provide a linear transmission device, the way in which the sensor is set will not affect the configuration of the surrounding space and will not affect the movement of the balls.

To achieve the aforesaid object, the linear transmission device of the present invention comprises a screw shaft, a moving member, a return element, a plurality of balls, and a sensor. The screw shaft comprises an external thread on an outer peripheral surface thereof. The moving member comprises a screw hole. The moving member is sleeved on the screw with the screw hole so as to be axially movable. The screw hole comprises an internal thread on the inner wall thereof. The internal thread of the moving member and the external thread of the screw shaft form a load path. The internal thread comprises an ineffective thread section. The moving member further comprises a receiving groove on one end thereof. The receiving groove is adjacent to the ineffective thread section of the internal thread. The return element is set in the moving member and comprises a return path. The return path is connected with the load path to form a circulating path for the balls to run. The sensor is set in the receiving groove of the moving member for sensing the temperature, vibration, or torque of the moving member during operation.

It can be seen from the above that the linear transmission device of the present invention embeds the sensor in the receiving groove so that the sensor will not protrude from the moving member, so it will not affect the configuration of the surrounding space and the stroke of the moving member, and even the size of the moving member can be appropriately reduced to meet different usage requirements. In addition, because the receiving groove is connected to the ineffective thread section and located in the non-load area, the sensor will not damage the structural rigidity of the moving member after the assembly is completed and will not affect the movement of the balls.

Preferably, the distance between the point farthest from the center of the screw hole and the center of the screw hole is a signal source radius. Take the center of the screw hole as the center, and draw a circle with the length difference between the signal source radius and the radius of the screw hole as the radius to define a ring-shaped signal sensitive area. The sensor comprises a vibration sensing chip, which is located in the signal sensitive area, so that the most accurate signal source can be obtained and the most accurate monitoring can be achieved.

Preferably, the sensor comprises a temperature sensing chip attached to the moving member, and an interposer made of electrical insulating material or thermally conductive material can be arranged between the two to prevent noise.

Preferably, the moving member can be a nut or a sliding base. If it is a nut, the receiving groove can be formed by recessing from one end surface of the nut along the axial direction or radial direction of the screw hole, or formed by recessing from an end surface of the nut along the axial direction of the screw hole and from the outer peripheral edge of the nut along the radial direction of the screw hole. If it is a sliding base, the receiving groove is recessed from an end surface of the sliding base along the axial direction of the screw hole.

Preferably, the sensor is covered by a cover plate provided in the receiving groove to prevent the sensor from being interfered by foreign objects and affecting the sensing accuracy.

Preferably, the sensor is connected to a signal wire. The signal wire can pass through the moving member along the axial direction of the screw hole or the radial direction of the screw hole to connect with a signal processor. The signal processor can be further connected to a terminal processor (such as a computer).

Preferably, the sensor is fixed to the moving member in an adhesive manner, for example, using epoxy resin.

The detailed structure, features, assembly or use of the linear transmission device provided by the present invention will be described in the detailed description of the subsequent implementation. However, those with ordinary knowledge in the field of the present invention should be able to understand that these detailed descriptions and specific embodiments listed in the implementation of the present invention are only used to illustrate the present invention, and are not intended to limit the scope of the patent application of the present invention.

DETAILED DESCRIPTION OF THE INVENTION

Figure 1:
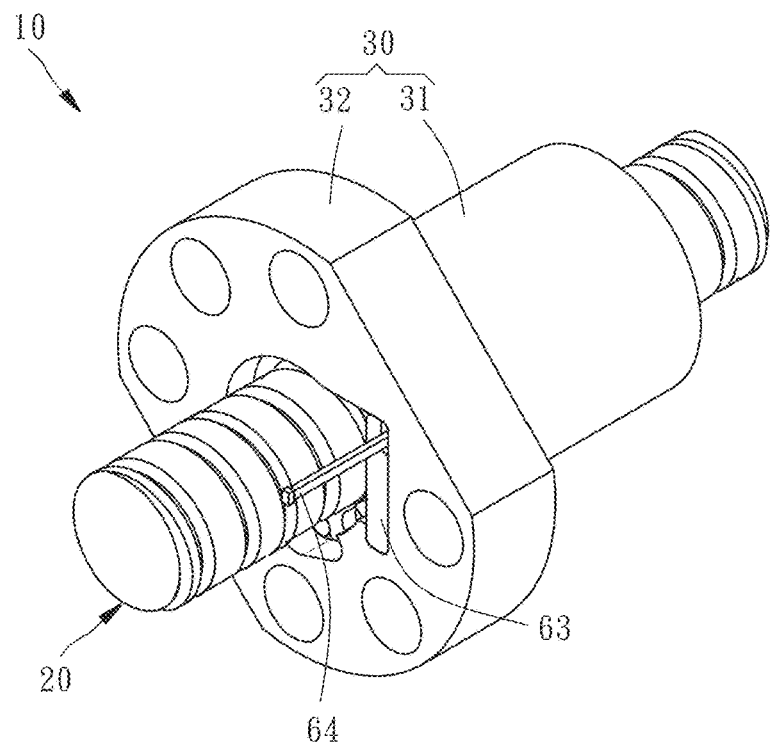
FIG. 1 is an oblique top elevational view of a linear transmission device in accordance with a first embodiment of the present invention.

The applicant first explains here that throughout the specification, including the embodiments described below and the claims in the scope of the patent application, the nouns related to directionality are based on the directions in the drawings. Secondly, in the embodiments and drawings that will be introduced below, the same element numbers represent the same or similar elements or their structural features.

Figure 2:
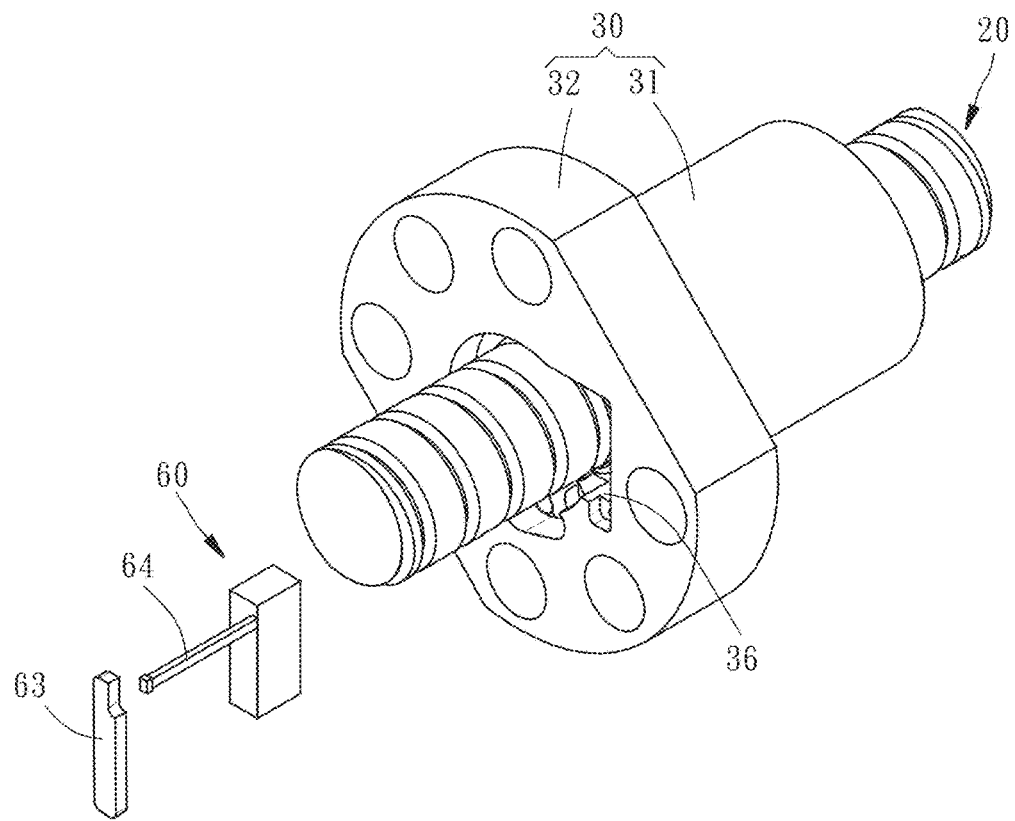
FIG. 2 is a partial exploded view of the linear transmission device in accordance with the first embodiment of the present invention.
Figure 3:
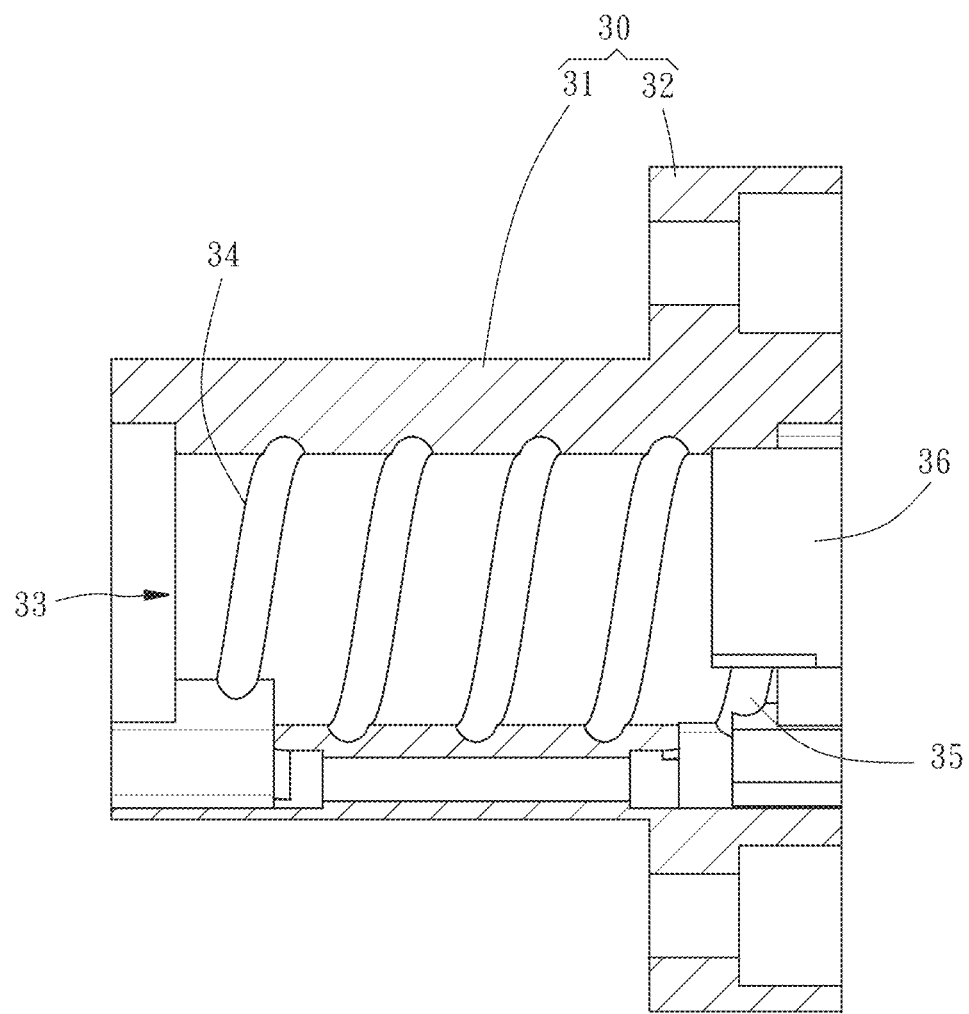
FIG. 3 is a sectional view taken along line 3-3 of FIG. 1.

Referring to FIGS. 1-3, the linear transmission device 10 in accordance with the first embodiment of the present invention comprises a screw shaft 20, a moving member 30, two return elements 40, a plurality of balls 50, and a sensor 60.

The outer peripheral surface of the screw shaft 20 has an external thread 22 extending along its axial direction.

Figure 4:
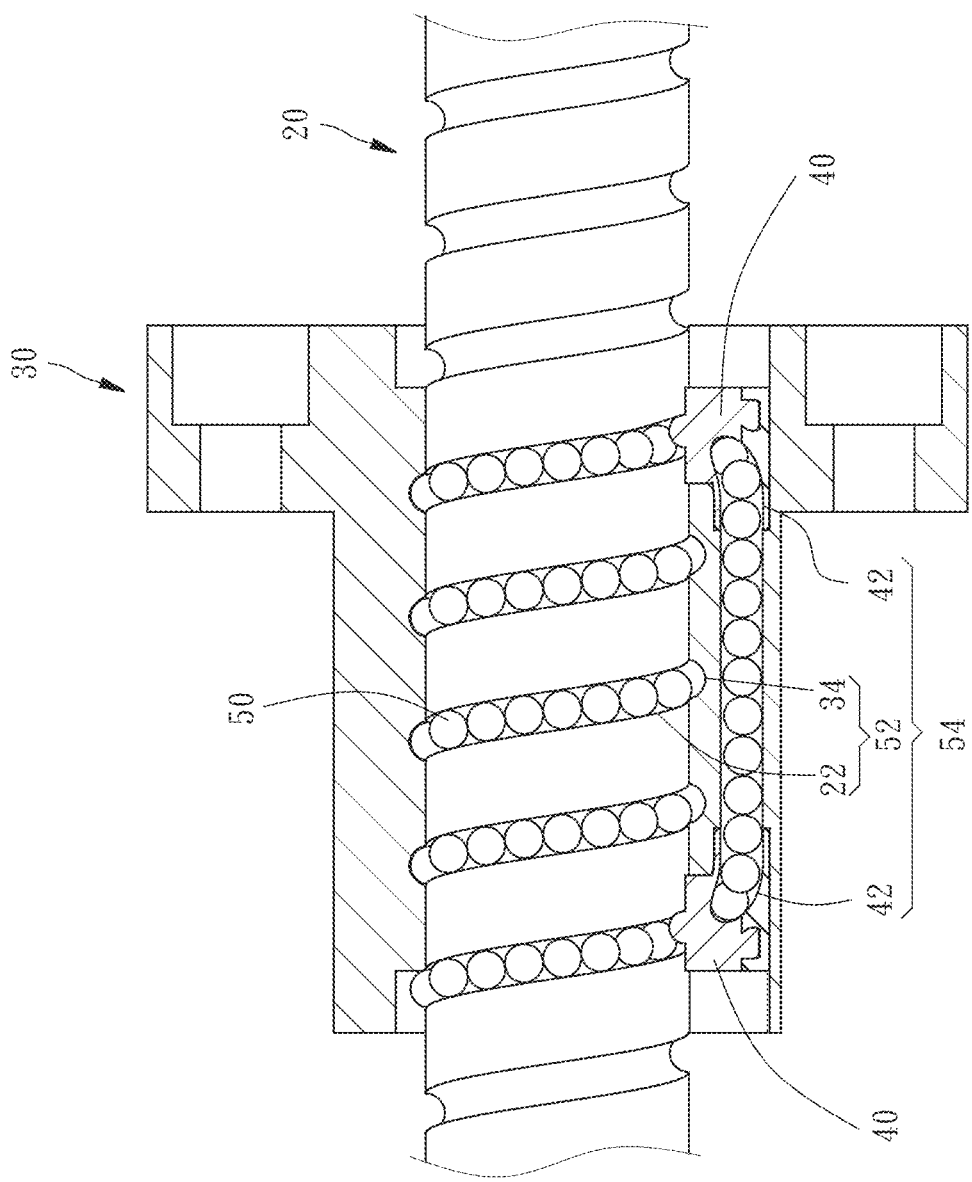
FIG. 4 is a cross-sectional view of the moving member provided by the linear transmission device in accordance with the first embodiment of the present invention.

The moving member 30 is a nut in this embodiment, comprising a body 31, a flange 32 connecting one end of the body 31, and a screw hole 33 passing through the body 31 and the flange 32. The moving member 30 is sleeved on the screw shaft 20 with screw hole 33 and movable along the axis of the screw shaft 20. The inner wall of screw hole 33 has an internal thread 34. The internal thread 34 of the moving member 30 and the external thread 22 of the screw shaft 20 form a load path 52 (as shown in FIG. 4). In addition, as shown in FIG. 3, the internal thread 34 has an ineffective thread section 35 (that is, an area through which no ball 50 passes). In this embodiment, the moving member 30 is recessed from an end surface of the flange 32 opposite to the body 31 along the axial direction of the screw hole 33 to form a receiving groove 36, and the receiving groove 36 is adjacent to and communicates with the ineffective thread section 35 of the internal thread 34. It is worth mentioning that the present invention can also be applied to the specifications of small nuts. At this time, the moving member 30 (nut) does not have a flange, and the receiving groove 36 is formed by recessing one end surface of the nut along the axial direction or radial direction of the screw hole 33.

As shown in FIG. 4, the two return elements 40 are provided at the two ends of the moving member 30, and the two return elements 40 respectively have a return path 42. The two return paths 42 are respectively connected with the two ends of the load path 52, so that the two return paths 42 and the load path 52 together form a circulating path 54 for the balls 50 to run.

Figure 5:
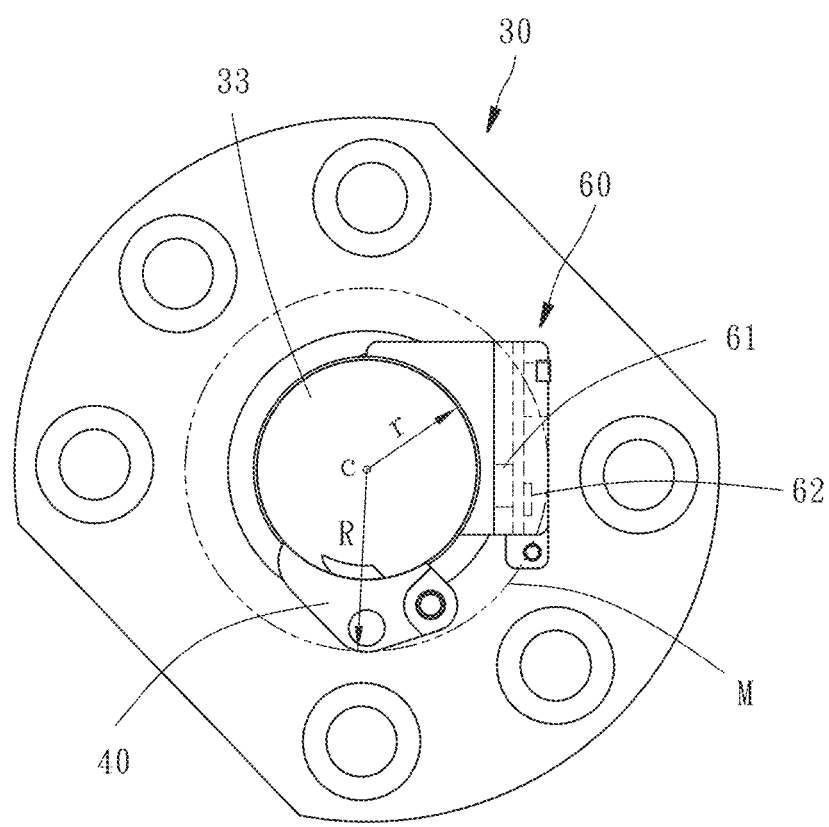
FIG. 5 is an end view of the linear transmission device in accordance with the first embodiment of the present invention.
Figure 6:
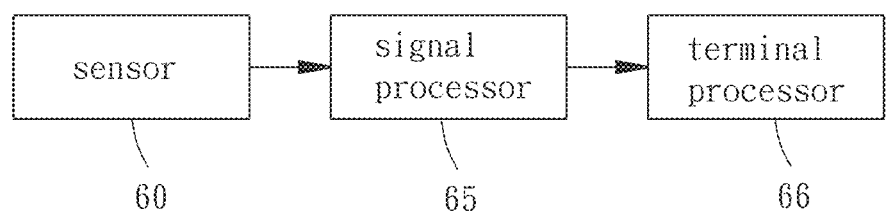
FIG. 6 is a block diagram of the linear transmission device in accordance with the first embodiment of the present invention.

The sensor 60 is set in the receiving groove 36 of the moving member 30 and is fixed to the moving member 30 with an electrically insulating adhesive (such as epoxy resin) and is staggered with the two return elements 40. The sensor 60 is also covered by a cover plate 63 arranged in the receiving groove 36 to prevent the sensor 60 from being interfered by foreign objects (such as dust) and affecting the sensing accuracy. As shown in FIGS. 2 and 5, the sensor 60 comprises a temperature sensing chip 61, and the temperature sensing chip 61 is attached to the moving member 30 to sense the temperature change of the moving member 30 during operation. The contact position between the temperature sensing chip 61 and the moving member 30 can be further equipped with an interposer (not shown in the drawings) made of electrically insulating material or thermally conductive material to prevent noise. As shown in FIG. 2 and FIG. 5, the sensor 60 further comprises a vibration sensing chip 62. The vibration sensing chip 62 is located in a ring-shaped signal sensitive area M to sense the vibration of the moving member 30 during operation. The signal sensitive area M takes the center C of the screw hole 33 as the center, and is defined by drawing a circle with the center of the screw hole 33 as the center and the length difference between a signal source radius R and the radius r of the screw hole 33 as the radius. The signal source radius R is the distance between the point farthest from the center C of the screw hole 33 of the return element 40 and the center C of the screw hole 33. This configuration can obtain the most accurate sensing results. As shown in FIG. 1, FIG. 2 and FIG. 6, the sensor 60 is connected to a signal wire 64. In this embodiment, the signal wire 64 passes through the moving member 30 along the axial direction of the screw hole 33 and is connected to a signal processor 65. The signal processor 65 is further connected to a terminal processor 66 (such as a computer) to analyze the sensing results of the sensor 60 and follow-up monitoring.

Figure 7:
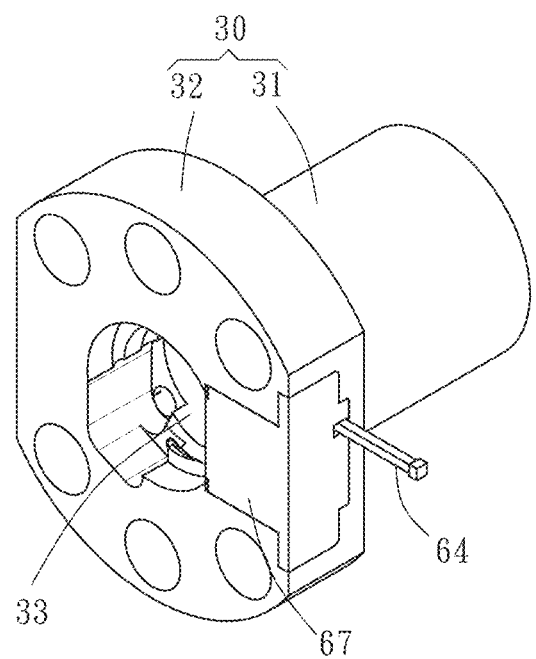
FIG. 7 is an oblique top elevational view of the linear transmission device with a screw omitted in accordance with a second embodiment of the present invention.
Figure 8:
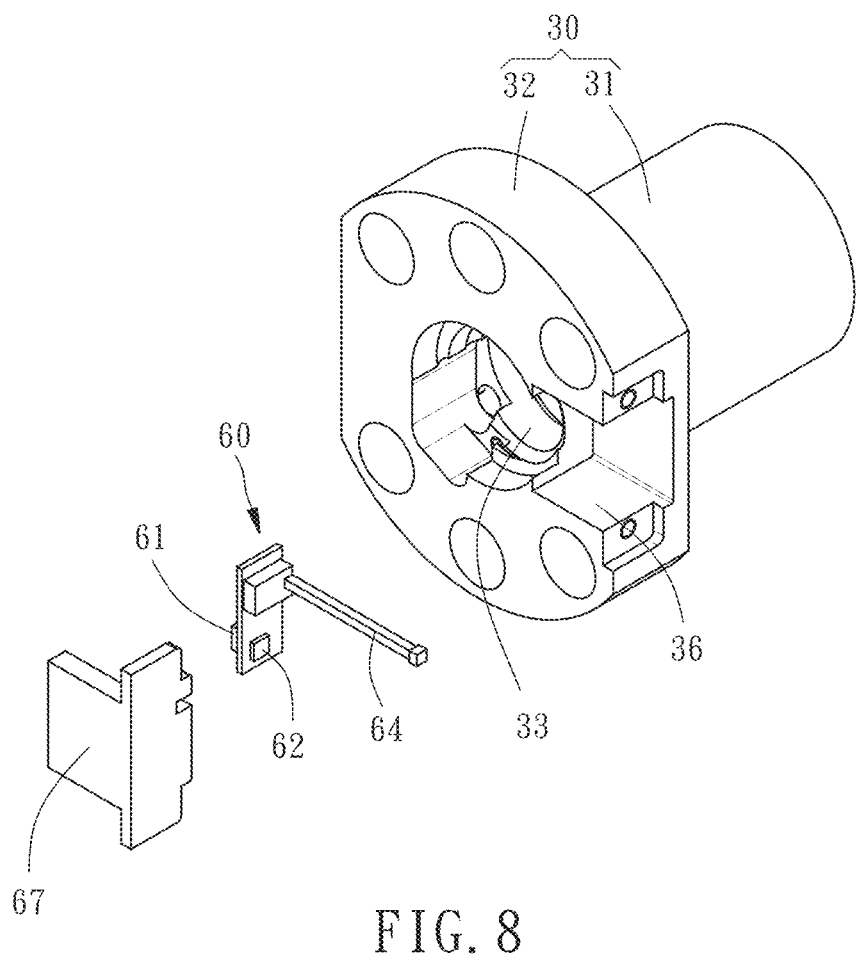
FIG. 8 is a partial exploded view of FIG. 7.
Figure 9:
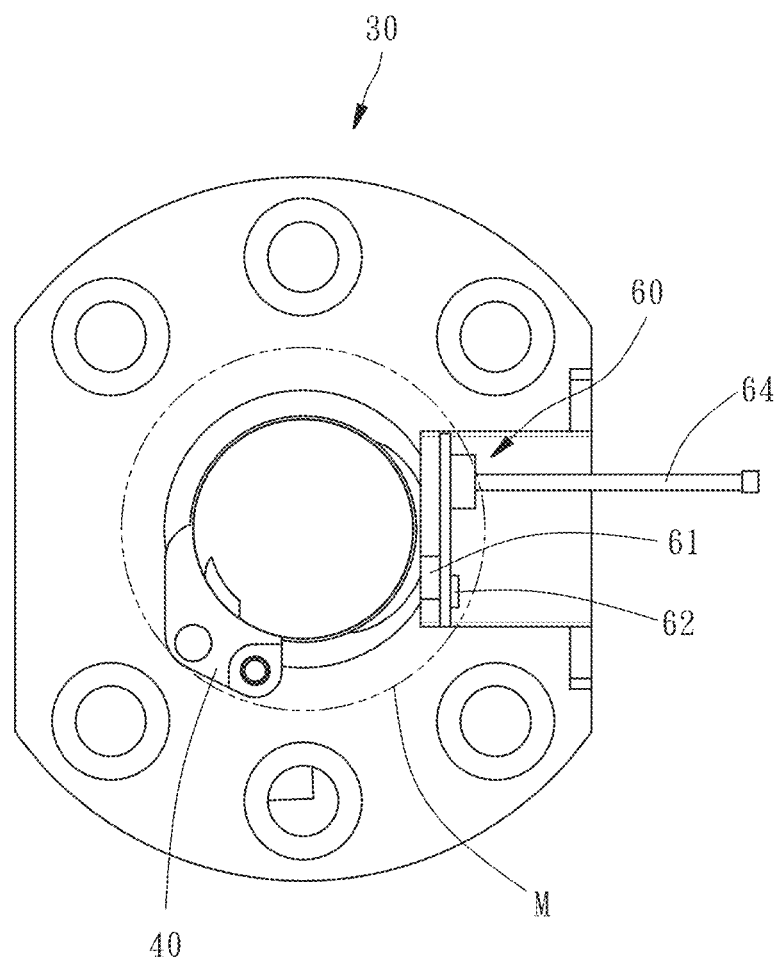
FIG. 9 is an end view of FIG. 7.

On the other hand, the structure of the present invention can have various changes. Referring to FIGS. 7 and 8, the second embodiment of the present invention is roughly the same in structure as the above-mentioned first embodiment. The main difference is that the receiving groove 36 is recessed from the end surface of the flange 32 back to the body 31 along the axial direction of the screw hole 33 and from the outer periphery of the flange 32 along the radial direction of the screw hole 33. The sensor 60 is located in the receiving groove 36 and is covered by the cover plate 67. The size of the cover plate 67 needs to match the size of the receiving groove 36, so that the cover plate 67 can reliably fix the sensor 60 in the receiving groove 36. It is worth mentioning that the present invention can also be applied to the specifications of small nuts. At this time, the moving member 30 (nut) does not have a flange. The receiving groove 36 is recessed from one end surface of the nut along the axial direction of the screw hole 33 and from the outer periphery of the nut along the radial direction of the screw hole 33. In addition, the signal wire 64 connected to the sensor 60 passes through the moving member 30 along the radial direction of the screw hole 33 to connect to the signal processor 65. As shown in FIG. 9, in the second embodiment of the present invention, the temperature sensing chip 61 of the sensor 60 is also attached to the moving member 30 to sense the temperature change of the moving member 30 during operation, and the vibration sensing chip 62 of the sensor 60 is also located in the ring-shaped signal sensitive area M to accurately sense the vibration of the moving member 30 during operation.

Figure 10:
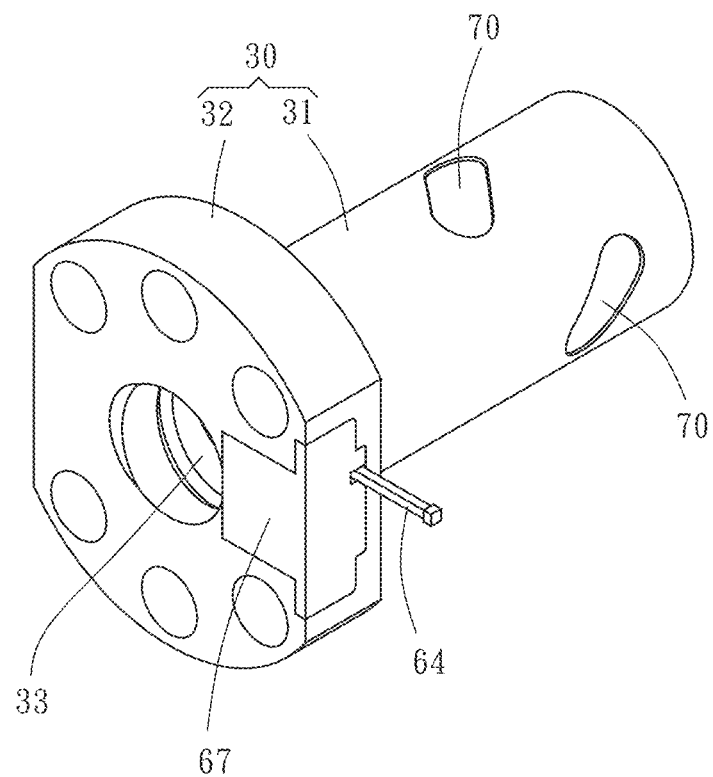
FIG. 10 is an oblique top elevational view of the linear transmission device with a screw omitted in accordance with a third embodiment of the present invention.
Figure 11:
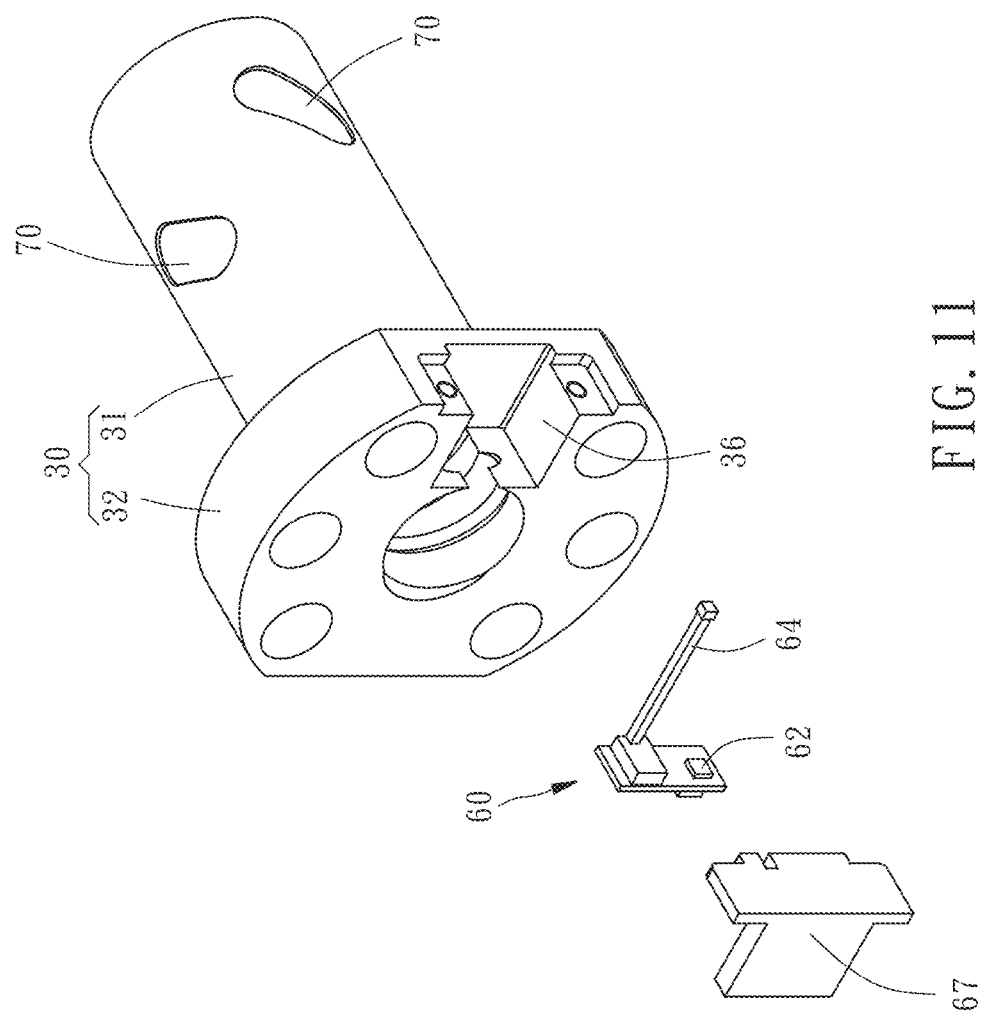
FIG. 11 is a partial exploded view of FIG. 10.

Please refer to FIG. 10 and FIG. 11, the third embodiment of the present invention is roughly the same as the second embodiment in structure, the main difference is that there are four return elements 70 provided by the third embodiment of the present invention. The four return elements 70 are embedded in the body 31 of the moving member 30 and are arranged in a spiral shape along the axial direction of the screw hole 33, so that the balls 50 form an internal circulation operation.

Figure 12:
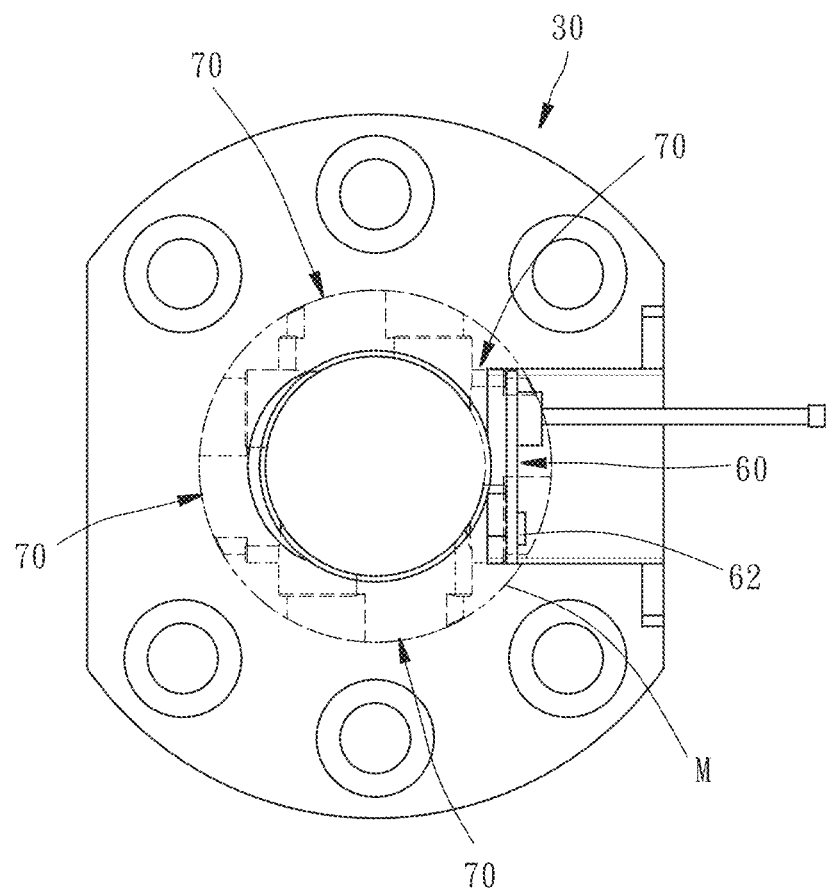
FIG. 12 is an end view of FIG. 10.

As shown in FIG. 12, in the third embodiment of the present invention, the vibration sensing chip 62 of the sensor 60 is also located in the ring-shaped signal sensitive area M to accurately sense the vibration of the moving member 30 during operation.

Figure 13:
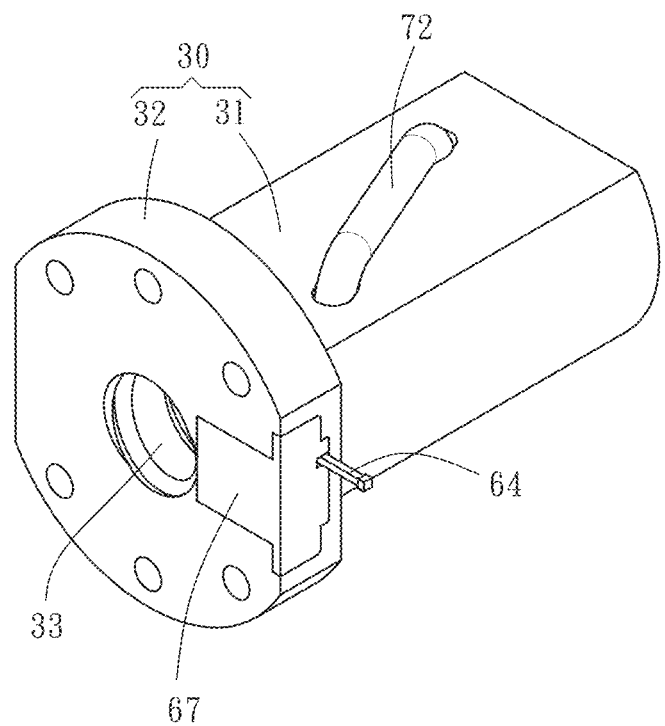
FIG. 13 is an oblique top elevational view of the linear transmission device with a screw omitted in accordance with a fourth embodiment of the present invention.
Figure 14:
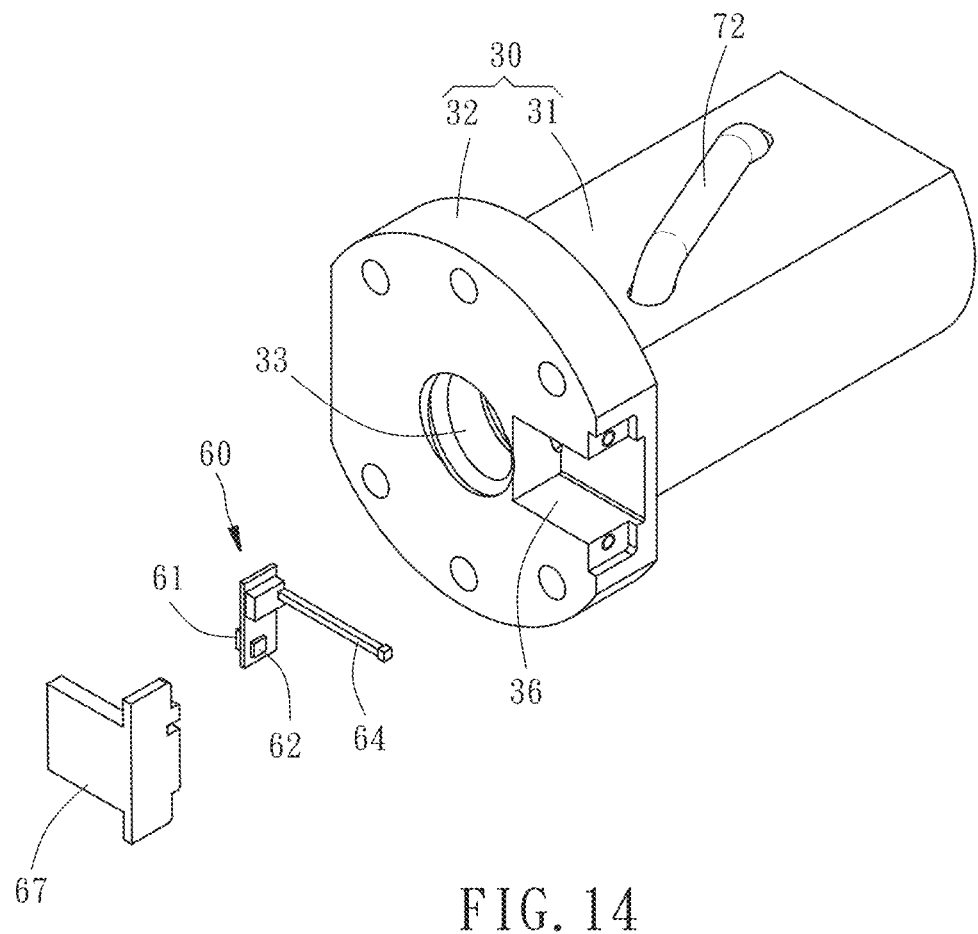
FIG. 14 is a partial exploded view of FIG. 13.
Figure 15:
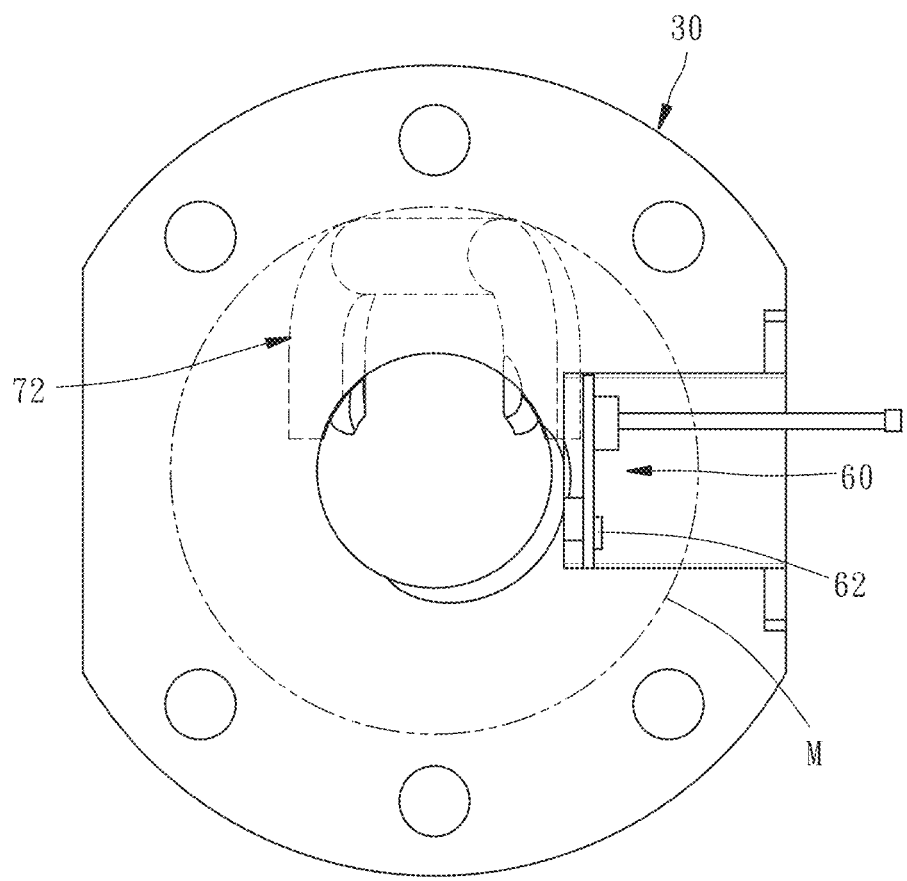
FIG. 15 is an end view of FIG. 13.

Please refer to FIGS. 13 and 14, the fourth embodiment of the present invention is roughly the same in structure as the third embodiment described above. The main difference is that the return element 72 provided by the fourth embodiment of the present invention has a curved tube shape and only one in number. The return element 72 protrudes out of the body 31 of the moving member 30, so that the balls 50 move in an external circulation type. As shown in FIG. 15, in the fourth embodiment of the present invention, the vibration sensing chip 62 of the sensor 60 is also located in the ring-shaped signal sensitive area M to accurately sense the vibration of the moving member 30 during operation.

Figure 16:
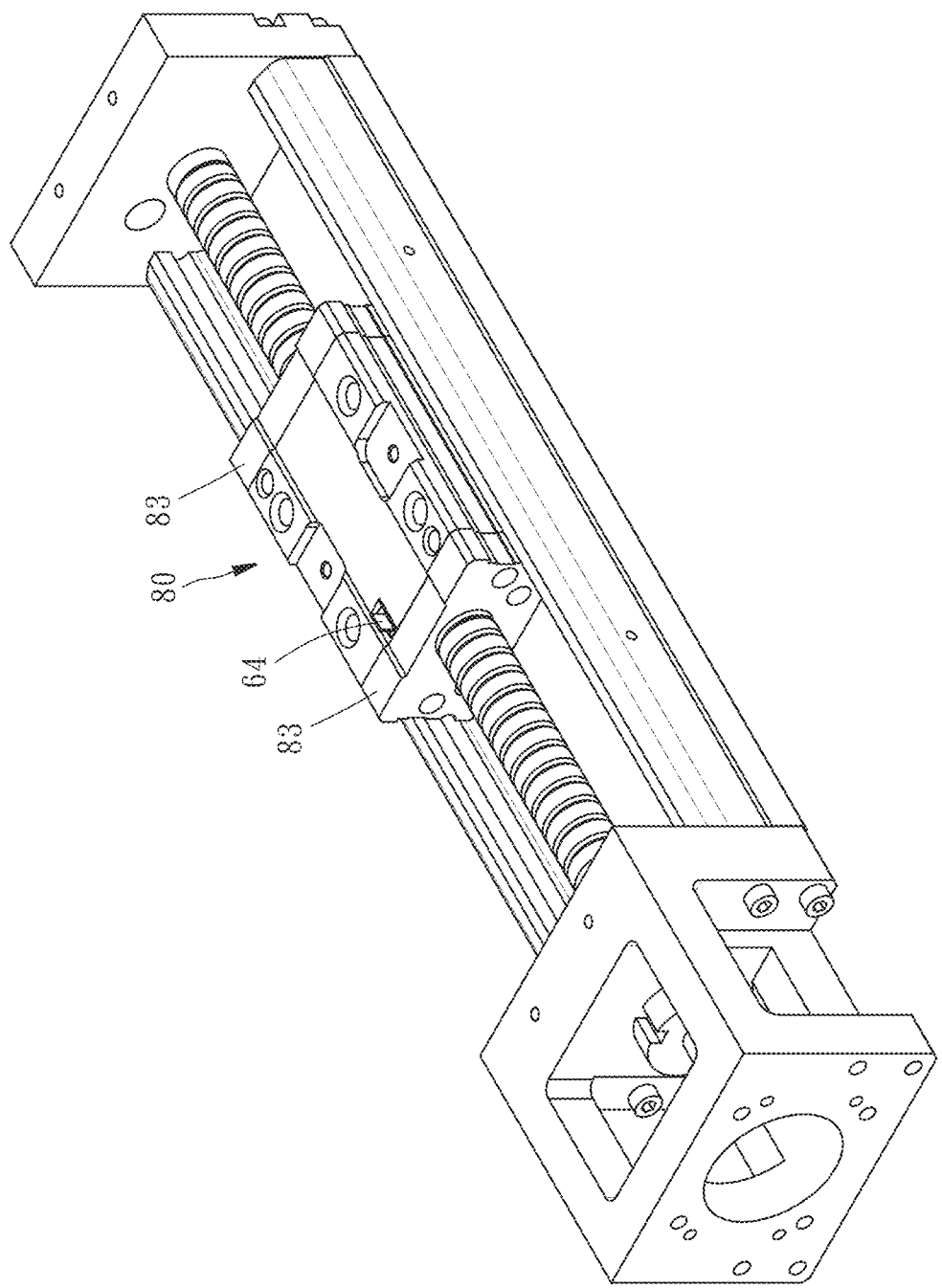
FIG. 16 is an oblique top elevational view of the linear transmission device in accordance with a fifth embodiment of the present invention.
Figure 17:
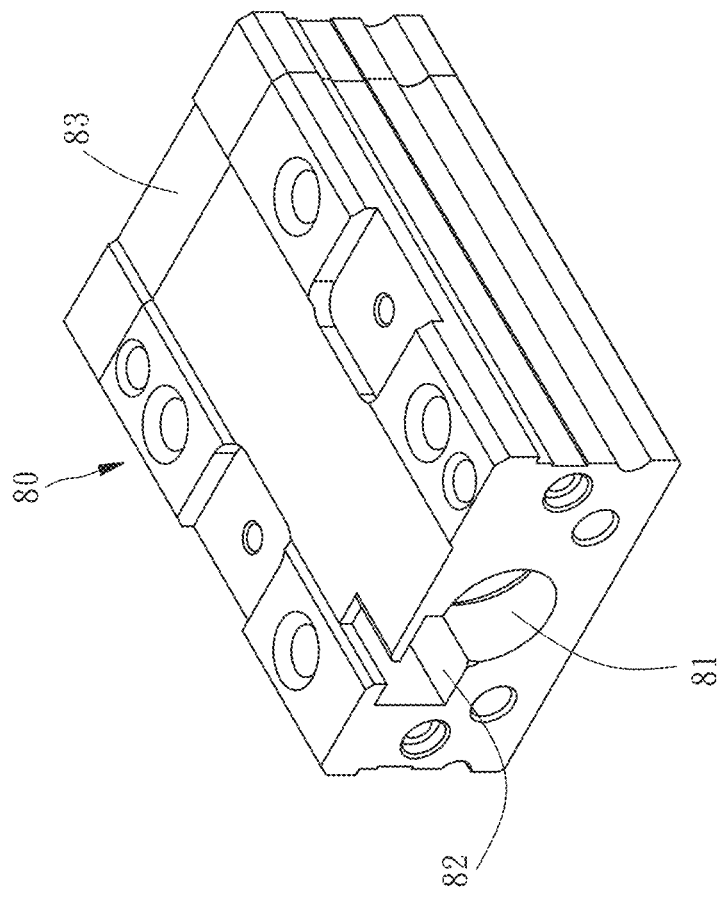
FIG. 17 is a partial exploded view of the linear transmission device in accordance with the fifth embodiment of the present invention.
Figure 17:
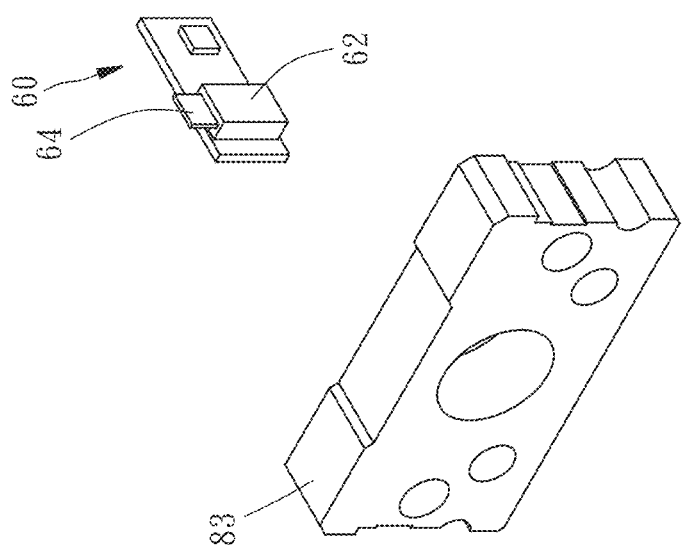
Figure 18:
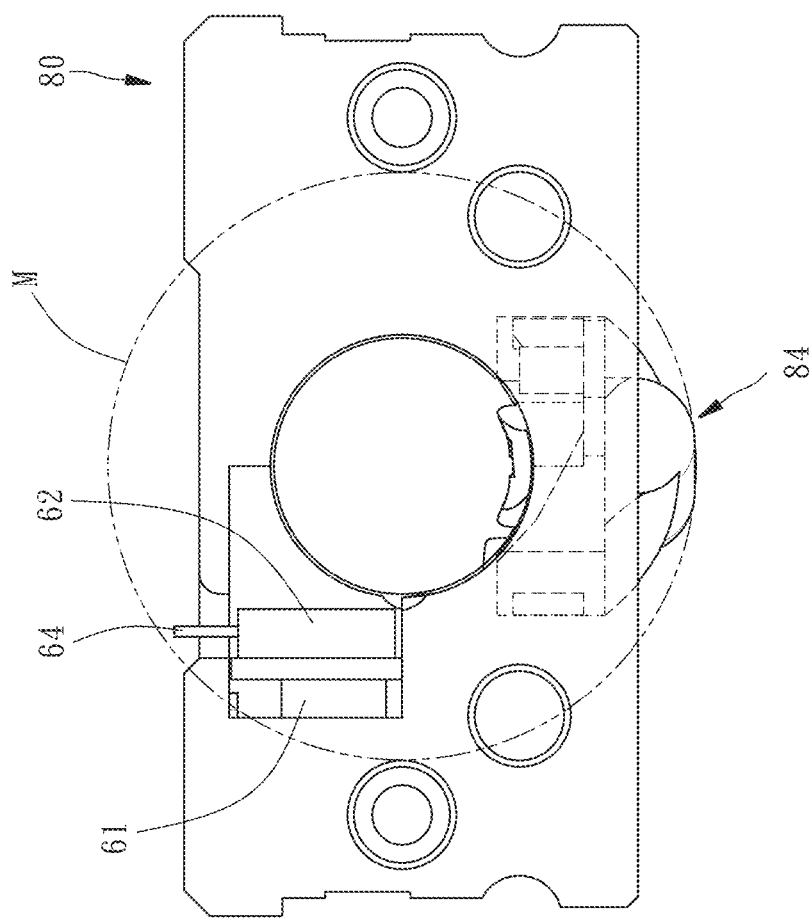
FIG. 18 is an end view of the moving member provided by the linear transmission device in accordance with the fifth embodiment of the present invention.

Referring to FIGS. 16 and 17, the moving member 80 provided by the fifth embodiment of the present invention is different from the moving member 30 of the foregoing embodiments. In the fifth embodiment of the present invention, the moving member 80 is a sliding base with a screw hole 81, the receiving groove 82 is formed by recessing one end surface of the sliding base along the axial direction of the screw hole 81, and the two end faces of the moving member 80 are respectively provided with a cover plate 83. One of the cover plates 83 covers the receiving groove 82 to keep the sensor 60 in the receiving groove 82. As for the number of return element 84, it is one and set on the bottom of the moving member 80. As shown in FIG. 17, the signal wire 64 connected to the sensor 60 goes up and out of the moving member 80 along the radial direction of the screw hole 81 to connect to the signal processor 65. As shown in FIG. 18, in the fifth embodiment of the present invention, the temperature sensing chip 61 of the sensor 60 is also attached to the moving member 80 to sense the temperature change of the moving member 80 during operation. The vibration sensing chip 62 of the sensor 60 is also located in the ring-shaped signal sensitive area M to accurately sense the vibration of the moving member 80 during operation.

In summary, in the present invention, the sensor 60 is embedded in the receiving groove 36 so that the sensor 60 will not protrude from the moving member 30, so it will not affect the configuration of the surrounding space and the stroke of the moving member 30. Even the size of the moving member 30 can be appropriately reduced to meet different usage needs, and the sensor 60 can be applied to different types of moving member 30 (nut) or moving member 80 (sliding base). In addition, because the receiving groove 36 is connected to the ineffective thread section 35 and is located in the non-load area, the movement of the balls 50 will not be affected after the assembly of the sensor 60, and the moving member 30 or 80 can maintain good structural rigidity.

What is claimed is:
1. A linear transmission device, comprising:
   a screw shaft having an external thread on an outer peripheral surface thereof;
   a moving member having a screw hole, said moving member being sleeved on said screw shaft with said screw hole so as to be axially movable, said screw hole having an internal thread on an inner wall thereof, said internal thread of said moving member and said external thread of said screw shaft forming a load path, said internal thread having an ineffective thread section, said moving member further having a receiving groove on one end thereof, said receiving groove being adjacent to said ineffective thread section of said internal thread;
   a return element disposed in said moving member and having a return path, said return path being connected with said load path to form a circulating path;
   a plurality of balls disposed in said circulating path; and
   a sensor disposed in said receiving groove of said moving member,
   wherein said receiving groove communicates with said ineffective thread section of said internal thread,
   wherein said sensor is staggered with said return element, and
   wherein said sensor comprises a vibration sensing chip located in a ring-shaped signal sensitive area defined by drawing a circle with a center of said screw hole as the center and the length difference between a signal source radius and a radius of said screw hole as the radius, said signal source radius being the distance between a point of said return element farthest from the center of said screw hole and the center of said screw hole.
2. The linear transmission device as claimed in claim 1, wherein said sensor further comprises a temperature sensing chip attached to said moving member.
3. The linear transmission device as claimed in claim 1, wherein said moving member is a nut, and said receiving groove is recessed from an end surface of said nut along an axial direction or radial direction of said screw hole.
4. The linear transmission device as claimed in claim 1, wherein said moving member is a nut, and said receiving groove is recessed from an end surface of said nut along an axial direction of said screw hole and from an outer periphery of said nut along a radial direction of said screw hole.
5. The linear transmission device as claimed in claim 1, wherein said moving member is a sliding base, and said receiving groove is recessed from an end surface of said sliding base along an axial direction of said screw hole.
6. The linear transmission device as claimed in claim 1, further comprising a cover plate set in said receiving groove to cover said sensor.

7. The linear transmission device as claimed in claim 1, wherein said sensor is connected to a signal wire passing out of said moving member along the axial direction of said screw hole.

8. The linear transmission device as claimed in claim 1, wherein said sensor is connected to a signal wire passing out of said moving member along the radial direction of said screw hole.

9. The linear transmission device as claimed in claim 1, wherein said sensor is fixed to said moving member by adhesive.

* * * * *